United States Patent
Neuhaus et al.

(10) Patent No.: US 9,919,808 B2
(45) Date of Patent: Mar. 20, 2018

(54) PIEZOELECTRICALLY-CONTROLLED FUEL DELIVERY SYSTEM

(71) Applicant: Parker-Hannifin Corporation, Cleveland, OH (US)

(72) Inventors: Donald A. Neuhaus, Smithtown, NY (US); Su Yin, Irvine, CA (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 75 days.

(21) Appl. No.: 15/135,929

(22) Filed: Apr. 22, 2016

(65) Prior Publication Data

US 2016/0347466 A1 Dec. 1, 2016

Related U.S. Application Data

(60) Provisional application No. 62/169,127, filed on Jun. 1, 2015.

(51) Int. Cl.
  *B64D 37/16* (2006.01)
  *G05D 7/06* (2006.01)

(52) U.S. Cl.
  CPC ........... *B64D 37/16* (2013.01); *G05D 7/0635* (2013.01)

(58) Field of Classification Search
  CPC ......... B64D 37/16; G05D 7/06; G05D 7/0635
  USPC ....................... 141/301; 251/129.05, 129.06; 137/599.18
  See application file for complete search history.

(56) References Cited

U.S. PATENT DOCUMENTS

| | | | | |
|---|---|---|---|---|
| 2,898,935 | A | * | 8/1959 | Harris ................... F16K 47/023 137/467 |
| 3,136,338 | A | * | 6/1964 | Stanford ................. F16K 21/10 137/630.14 |
| 4,917,351 | A | * | 4/1990 | Lindbloom ......... F16K 31/0651 251/129.05 |
| 5,305,790 | A | * | 4/1994 | Giacomini ............ F16K 5/0605 137/542 |
| 5,747,951 | A | | 5/1998 | Audren |
| 6,168,133 | B1 | * | 1/2001 | Heinz .................. F02M 47/027 251/129.06 |
| 6,385,429 | B1 | | 5/2002 | Weber et al. |
| 7,318,576 | B2 | | 1/2008 | Bauerle et al. |
| 7,368,853 | B2 | | 5/2008 | Magnussen et al. |
| 7,541,718 | B2 | | 6/2009 | Kurosawa |
| 8,608,127 | B2 | | 12/2013 | Rosenthal et al. |

(Continued)

*Primary Examiner* — Timothy L Maust

(74) *Attorney, Agent, or Firm* — Renner, Otto, Boisselle & Sklar L.L.P.

(57) ABSTRACT

A fuel delivery system is provided for filling a fuel tank with a prescribed volume of fuel. The delivery system includes a fuel tank, a piezoelectrically-actuated fill control valve for controlling flow of fuel into the fuel tank, and a controller for controlling the closure rate of the fill control valve to accurately control the volume of fuel provided to the fuel tank. The controller receives an input corresponding to a measured volume of flow through the system and allows for closure of the fill valve at variable closure rates. The fill control valve is piezoelectrically-actuated and controlled by the controller such that each successive variable closure rate is relatively slower than the previous closure rate. In this way impact loads from shutting off the fill control valve are minimized to achieve a fill volume as close as possible to the prescribed volume.

20 Claims, 3 Drawing Sheets

(56) References Cited

U.S. PATENT DOCUMENTS

| | | | |
|---|---|---|---|
| 8,701,712 B2* | 4/2014 | Denney | F16L 55/05 |
| | | | 138/30 |
| 2009/0277519 A1* | 11/2009 | Parker | F15B 19/002 |
| | | | 137/625.65 |
| 2010/0072706 A1 | 3/2010 | Schmitz et al. | |
| 2013/0145760 A1 | 7/2013 | Gondo | |

* cited by examiner

PIEZOELECTRICALLY-CONTROLLED FUEL DELIVERY SYSTEM

This application claims the priority of U.S. Provisional Application No. 62/169,127, filed on Jun. 1, 2015, which is hereby incorporated by reference in its entirety.

FIELD OF INVENTION

The present invention relates generally to fuel delivery and storage systems, particularly for use in aerospace applications.

BACKGROUND

Fuel systems are used to deliver fuel to one or more storage tanks and to enable sealed storage of the fuel in the storage tanks. Shutoff valves are often used to control flow between the storage tanks and/or between portions of the tanks, which may be interconnected. Ball valves controlled by electromagnetic motors are typically used, such as due to low cost, efficiency, and availability. Such electromagnetic motors provide high speed to quickly enable or cut off flow through associated shutoff valves.

For use in aerospace applications, such as in connection with fuel tanks of an aircraft, spacecraft, or a combination thereof, such electromagnetic valves, providing high speed and also low torque, are often coupled to several stages of gears. This coupling slows down the rotational speed and amplifies the output torque of the electromagnetic actuators of the electromagnetic valves. In this way low speed and high torque are obtained, which are needed to overcome frictional and fluid induced forces moving through and valves and to prevent an excessively high surge pressure induced by a sudden stop of the fluid flow through the valves.

As a consequence, inertia, hysteresis and backlash associated with the use of the stages of gears often slows down the response time, decreases the positioning accuracy, and introduces extra noise and impact loads with respect to the associated ball valves. The use of the gears also increases the part count, cost and weight in the associated bill of materials and introduces components requiring replacement and/or maintenance.

In addition, electromagnetic motors typically rely on magnetic fields generated, such as by permanent magnets or by current flowing through windings, to convert electromagnetic energy into mechanical energy. In the case of aerospace applications where electromagnetic interference must be minimized, additional components are necessary to address the EMI concerns, further increasing cost and complexity of associated fuel delivery systems.

SUMMARY OF INVENTION

The present invention provides a fuel delivery system for filling a fuel tank with a prescribed volume of fuel and includes a fuel tank, a piezoelectrically-actuated fill control valve for controlling flow of fuel into the fuel tank, and a controller for controlling the closure rate of the fill control valve to accurately control the volume of fuel provided to the fuel tank. The controller receives an input corresponding to a measured volume of flow through the system and allows for closure of the fill valve at variable closure rates.

The fill control valve is piezoelectrically-actuated and piezoelectrically-controlled, where the piezoelectric elements are controlled by the controller such that each successive variable closure rate is relatively slower than the previous closure rate. In this way impact loads of fuel moving towards and through the fill control valve are minimized to obtain a fill volume as close as possible to the prescribed volume. Further, the associated fuel delivery system is suitable for use in aerospace applications as it is EMI immune, provides fast response, and minimizes part cost, weight, quantity and maintenance as compared to an electromagnetically controlled fuel delivery system.

According to one aspect of the invention, there is a fuel delivery system for filling a fuel tank with a prescribed volume of fuel. The fuel delivery system includes a fill control valve fluidly connectable to the fuel tank for controlling flow of fuel into the fuel tank, wherein the fill control valve is a piezoelectrically-actuated shutoff valve for shutting off flow into at least a portion of the fuel tank. The fuel delivery system also includes a controller for controlling the closure rate of the fill control valve to accurately control the volume of fuel provided to the fuel tank. The controller receives an input corresponding to a measured volume of flow through the system, and the controller allows for closure of the fill control valve at a first valve closure rate and thereafter at a second relatively slower valve closure rate after a prescribed amount of fluid has passed through the fill control valve.

The fuel delivery system may further include a sensor sensing the fluid passing through the fill control valve and communicatively coupled to the controller, where the sensor sends to the controller an output corresponding to the measured volume of flow through the system.

Each of the first and second valve closure rates may be a continuously linearly reducing rate.

The fill control valve may have a valve member movable between an open position allowing flow through the fill control valve and a closed position stopping flow through the fill control valve, where the first valve closure rate is a result of the controller moving the valve member to the closed position at a constant speed, and where the second valve closure rate is a result of the controller moving the valve member to the closed position at a continuously linearly reducing speed.

The controller may allow for closure of the fill control valve for a relatively longer period of time at the first valve closure rate than at the second valve closure rate.

The controller may transition the closure of the fill control valve from the first valve closure rate to the second valve closure rate without pause in closure of the valve.

The first valve closure rate may provide greater than 50% closure of the fill control valve.

The fluid delivery system may be in combination with the fuel tank, the fill control valve being connected to the fuel tank.

There may be an aerospace vehicle including the fuel delivery system.

The fluid delivery system may be in in combination with a plurality of fuel tanks fluidly connected via a plurality of fill control valves.

The controller may separately control the closure rate of each fill control valve of the plurality of fill control valves to accurately control the volume of fuel provided to each fuel tank, where the controller receives an input corresponding to a measured volume of flow through each fill control valve of the plurality of fill control valves.

The fluid delivery system may further include a piezoelectric motor coupled to the fill control valve, where the piezoelectric motor includes piezoelectric ceramics and/or piezoelectric polymers.

The controller may allow for closure of the fill control valve at a third valve closure rate subsequently after a prescribed amount of fluid has passed through the fill control valve at the first and second valve closure rates, where the third valve closure rate is relatively slower than each of the first and second valve closure rates.

The third valve closure rate may be a result of the controller allowing the valve to close at a continuously linearly reducing speed.

According to another aspect of the invention, there is a fuel delivery system for filling a fuel tank with a prescribed volume of fuel. The fuel delivery system includes a fuel tank and a fill control valve fluidly connected to the fuel tank for controlling flow of fuel into the fuel tank. The fill control valve has a valve member movable between an open position allowing flow through the fill control valve and a closed position stopping flow through the fill control valve. The fill control valve is a piezoelectrically-actuated shutoff valve for shutting off flow into at least a portion of the fuel tank. The fuel delivery system also includes a controller for controlling the closure rate of the valve member to accurately control the volume of fuel provided to the fuel tank. The controller receives an input corresponding to a measured volume of flow through the system. The controller allows for movement of the valve member to the closed position at a constant speed during a first phase and thereafter at a continuously linearly reducing speed during a second phase, where the constant speed of the first phase is faster than any speed during the second phase.

The controller may transition the valve member from the first phase to the second phase without pause in movement of the valve member, where the first speed of the second phase is equal to the constant speed of phase one.

The controller may control the fill control valve for a relatively longer first phase than second phase.

The constant speed closure of the fill control valve in the first phase may provide greater than 50% closure of the valve member from the open position to the closed position.

According to yet another aspect of the invention, there is a method of filling a fuel tank with a prescribed volume of fuel. The method includes the steps of (a) opening a piezoelectrically-actuated fill control valve fluidly connected to the fuel tank to allow fuel into the tank; (b) closing the fill control valve at a first valve closure rate after the fill control valve receives a closing signal from a controller receiving an input corresponding to a measured volume of flow through the system; and (c) after closing the fill control valve at the first valve closure rate, closing the fill control valve at a second relatively slower valve closure rate after a prescribed amount of fluid has passed through the fill control valve.

The method may further include the step of closing the fill control valve at a third valve closure rate after a prescribed amount of fluid has passed through the fill control valve at the first and second valve closure rates, where the third valve closure rate is relatively slower than each of the first and second valve closure rates.

The closing the fill control valve at the first valve closure rate may occur for a relatively longer period of time than the closing the fill control valve at the second valve closure rate.

The closing the fill control valve at the first valve closure rate may include moving a valve member of the fill control valve at a constant speed from an open position towards a closed position, where closing the fill control valve at the second valve closure rate includes moving the valve member towards the closed position at a continuously linearly reducing speed.

The constant speed may be relatively faster than any speed during the continuously linearly reducing speed.

The foregoing and other features of the invention are hereinafter described in greater detail with reference to the accompanying drawings.

DETAILED DESCRIPTION

The principles of the present disclosure have general application to fluid delivery systems and more particular application to a fuel delivery system for use in an aerospace application, such as in connection with an aircraft. As used herein, the term "fluid" refers to liquid, gas, or any combination thereof. Of course, the principles of the present disclosure may also be useful in applications other than fuel delivery applications, such as in other fluid transfer operations, such as for moving water, alcohol, oxygen, etc., or in application other than aerospace applications. For example, the fuel delivery system of the present disclosure may be suitable in any operation where precise control of the amount of fuel flowing into a tank is required.

Figure 1:
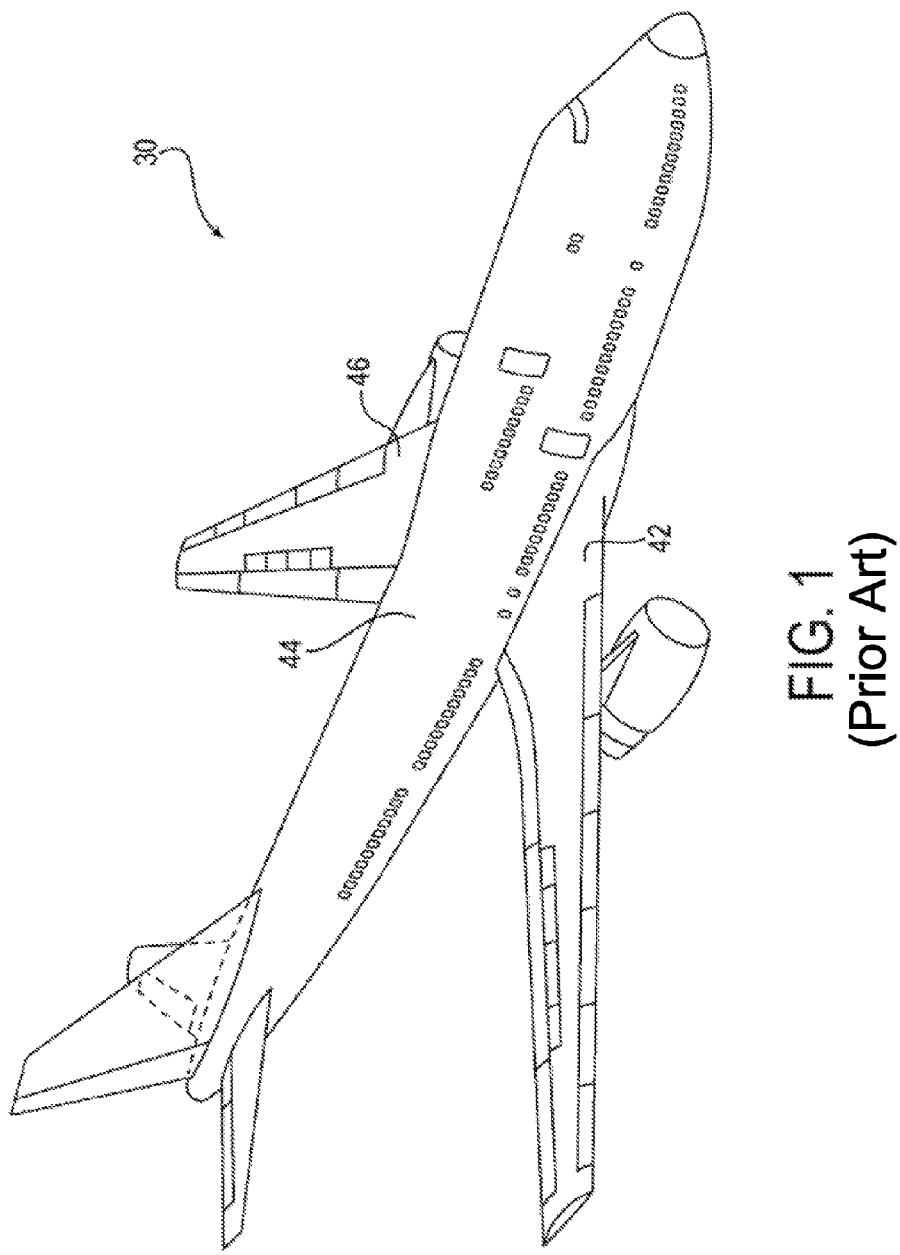
FIG. 1 is an orthogonal view of an exemplary aircraft using an exemplary fuel delivery and storage system.
Figure 2:
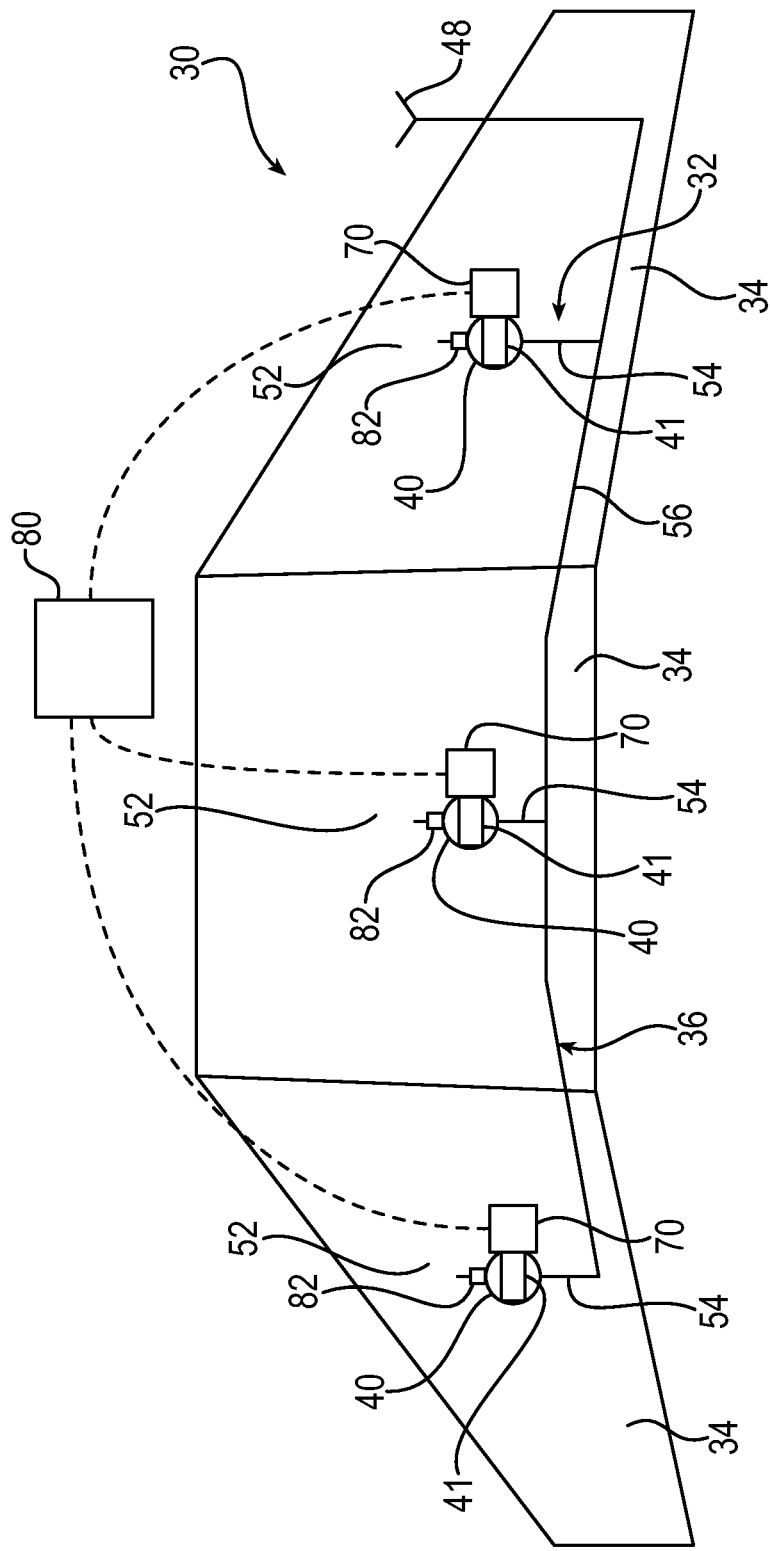
FIG. 2 is a schematic representation of the exemplary fuel delivery and storage system.

Turning now to FIG. 1, an exemplary aircraft 30 is depicted that uses an exemplary fuel delivery system of the invention. As shown in FIG. 2, the aircraft 30 includes a fuel delivery system 32 having a plurality of storage tanks 34, a fuel flow conduit 36 and control valves 40. The delivery system 32 allows fuel to flow into or out of the tanks 34 and is configured to allow filling of one or more of the tanks 34 with a prescribed volume of fuel. In some embodiments, the delivery system 32 may maintain selective fluid separation between the tanks 34 and from the environment external to the tanks 34, such as via the control valves 40.

The depicted storage tanks 34, such as fuel storage tanks, span the aircraft 30 from a first wing 42, across the fuselage 44, and to the second wing 46. While three tanks 34 are shown, any suitable number of tanks may be included. Alternative or additional fuel storage tanks may be located at any other suitable location of the aircraft 30 in other embodiments. The tanks 34 may be integrally connected as shown, or instead any number of tanks 34 may be spaced apart. Further one or more tanks 34 may have fluidly separated portions.

The delivery system 32 includes a refuel coupling 48 fluidly connected to the flow conduit 36 that allows for connection to a fuel supply. As used herein, coupling may be direct or indirect. Fuel may be moved, such as pumped, from the fuel supply, through the refuel coupling 48, and into the flow conduit 36 towards the tanks 34. While one refuel coupling 48 is shown, additional refuel couplings 48 may be included in other embodiments. The refuel coupling 48 may be a quick connect coupling and/or may include a backflow preventer.

Flow conduit 36 for directing fuel flow to the one or more tanks 34 may be located in any suitable location for moving fuel to and/or between the tanks 34. As shown, each tank 34 has a tank flow access portion 52 for coupling to the corresponding access conduit 54 of the flow conduit 36. As used herein the term "coupling" may refer to direct or indirect coupling. For example the tank flow access portion 52 may be coupled to an associated access conduit 54 via a fill control valve 40. While the conduit 36 is shown having separate access conduits 54 branching off from a main line portion 56, any number of tanks 34 may instead be fluidly connected in series.

Referring now to one tank 34, one of the control valves 40, such as a fill control valve, is fluidly connectable to the associated tank 34 for controlling, such as shutting off, flow of fuel or other fluid to at least a portion of the tank 34. In the case that fuel or other fluid is pumped out of the tank 34, the fill control valve 40 may also control flow out of the tank 34.

The fill control valve 40 is a shutoff valve having a valve member 41 that moves between an open and closed position. In the fuel delivery system 32, any number of control valves 40 may be ball valves and the associated valve members 41 may be the rotating balls of the valves 40. One or more valves may additionally or alternatively be a gate valve, plug valve, or any other type of shutoff valve having a valve member such as a gate or plug, the position of which may be accurately controlled to control the amount of flow through the associated shutoff valve.

For example, the fill control valve 40 may be a ball valve having a ball valve member 41 with a transfer passage extending through the ball valve member 41. The passage may be aligned between a valve inlet and a valve outlet of the valve to allow fluid to flow through the valve, such as to the tank 34. Movement and position, such as rotation of the ball valve member 41, and thus also of the transfer passage, may be selectively controlled. The controlling enables adjustment of the amount of flow moving between the valve inlet and outlet and thus through the fill control valve 40.

In the depicted embodiment of FIG. 2, each fill control valve 40 is shown controlling flow between the main line portion 56 and a respective access conduit 54. In some embodiments, one or more fill control valves 40 may control flow between two or more tanks 34. In some embodiments, a fill control valve 40 may be disposed along the main line portion 56 instead of along the respective access conduit 54 as depicted.

The fill control valves 40 of the embodiment of FIG. 2 preferably are piezoelectrically-actuated valves. One or more piezoelectric motors 70 may be associated with each fill control valve 40 for opening and closing the associated valve 40. It will be appreciated that in other embodiments, one or more of the control valves 40 may be actuated non-piezoelectrically where suitable for a particular application.

In the depicted example, a piezoelectric motor 70 is configured, such as having piezoelectric actuators, to accurately position the ball valve member 41 of a respective ball-type control valve 40 to control flow through the control valve 40. In such example, the piezoelectric motor 70 may be coupled to a respective ball valve member 41 via a stator. Actuation of the piezoelectric motor 70 will turn the stator, thus turning the ball valve member 41 to move the ball valve member 41 between open and closed positions of the associated control valve 40.

Referring now to one piezoelectric motor 70, the motor 70 includes a piezoelectric ceramic, polymer or composite thereof as a resonator material in the motor 70. In a preferred embodiment, both piezoelectric ceramics and piezoelectric polymers are included in the composite. The piezoelectric ceramics and piezoelectric polymers may be provided in a mixed composite or may be structured in layers, such as in alternating layers. One or more different piezoelectric ceramics and/or one or more piezoelectric polymers may be used.

The combination of piezoelectric ceramics and piezoelectric polymers incorporated together as the resonator of the motor 70 may allow the resonators to have improved toughness for fracture resistance and better fatigue life and machinability as compared to resonators made only of a piezoelectric ceramic or piezoelectric polymer. This is because piezoelectric ceramics while having high piezoelectric constants and high mechanical quality factors also typically have low impact resistance, low fracture resistance, and are difficult to form into complex shapes. Also, piezoelectric polymers, while providing better mechanical flexibility and machinability than piezo electric ceramics, typically have relatively lower piezoelectric constants. Thus, preferably incorporated together, a composite may have greater machinability and longevity, and may be suitable for aerospace applications wherein components encounter high vibration and impact loads.

The piezoelectric motor 70 also preferably includes a pusher disposed between the piezoelectric elements and a rotor coupled to the stator, such that the rotor is not directly in contact with the piezoelectric elements. This is because over prolonged operation, such as in aerospace applications where varying temperatures are often encountered, the shape of the rotor surface may incur small changes. In such case, mismatch of coefficients of thermal expansion may occur between the piezoelectric elements and the rotor. This mismatch can cause changes in the associated interference fit affecting performance and stability of the associated motor.

The use of a pusher, such as made of a shape memory material, minimizes these issues. For example, one type of shape memory pusher material can change its shape with respect to varying temperatures. The varying of the shape of the pusher engaging the rotor allows for better engagement of the pusher and rotor and thus improved accuracy and stability across operating temperature ranges typically encountered by an aircraft.

Along with being suitable in varying temperature situations, piezoelectric motors also are suitable for use in aerospace applications for additional reasons. For instance, typical piezoelectric motors do not produce electromagnetic interference and are not generally susceptible to external electromagnetic interference. Further, piezoelectric motors are relatively less complex and less heavy than comparable electromagnetic motors modified for aerospace applications, as previously mentioned.

In addition to aforementioned reasons, as compared to electromagnetically-actuated valves and associated electromagnetic motors, a piezoelectric motor and piezoelectrically-actuated valve are more suitable for aerospace refuel applications where it is desirable to get as close to a prescribed refuel target as possible. This is because going over the target provides the associated aircraft with more fuel to carry, impacting weight and thus operational profit margins. On the other hand, filling under the target provides a risk of not having enough fuel reserves, such as in emergency situations.

The prescribed fill target can be controlled in part by fast closure. The target can also be controlled in another part by minimizing structural loads imposed on system components via minimizing surge pressure flowing through the flow conduit 36 and into the tanks 34 via a relatively slower closure rate. Both counter principles can be obtained via use of the piezoelectric motor 70 to provide variable and accurate closure of the associated fill control shutoff valve 40, thereby providing optimized refuel targeting and minimized surge pressure.

With respect to a fill control valve 40 that is a ball valve, the amount of closure resulting from the closure rate may correspond to the amount of rotation of the corresponding valve member 41 of the ball valve. On the other hand, with respect to a gate valve, the amount of closure may correspond to the distance between a linearly translating gate valve member and an associated valve seat. In the case of a plug valve, the amount of closure may correspond either to a translation distance or to a rotational amount depending on the type of plug valve.

In the depicted embodiment, a controller 80, a flow sensor 82, and the piezoelectric motor 70 collectively enable control of each of the fill control shutoff valves 40 to accurately enable filling of an associated tank 34 closer to a prescribed amount than via use of an electromagnetically-actuated shutoff valve.

As shown in FIG. 2, the fuel delivery system 32 includes the controller 80 for controlling the closure rate of one or more of the fill control valves 40 to accurately control the volume of fuel provided to respective fuel tanks 34. The controller 80 is communicatively coupled to the respective piezoelectric motors 70 and to the respective flow sensors 82. It will be appreciated that while shown separately in FIG. 2, in other embodiments any of the controller 80, respective sensor 82, respective fill control valve 40, and respective piezoelectric motor 70 may be integral with one another.

The controller may separately control the closure rate of each fill control valve 40 in response to separate inputs sent by and received from each sensor 82 corresponding to a measured volume of flow through each fill control valve 40. Via corresponding signals to the respective piezoelectric motors 70, this separate controlling allows the controller 80 to accurately control the volume of fuel provided separately to each fuel tank 34.

The controller 80 receives inputs from the one or more flow sensors 82 that correspond to a measured volume of flow through the system 32, such as through the associated fill control valves 40. The sensors 82 may be provided at any suitable location for sensing flow through the respective fill control valves 40, such as upstream of, downstream of, or within the fill control valves 40. Each sensor 82 may be placed in the same or different respective location, such as upstream of the respective fill control valves 40.

The sensors 82 may be any suitable type for sensing the fluid passing through the fill control valves 40. For example, suitable types include flow meters, pressure sensors, position sensors, speed sensors, etc.

Figure 3:
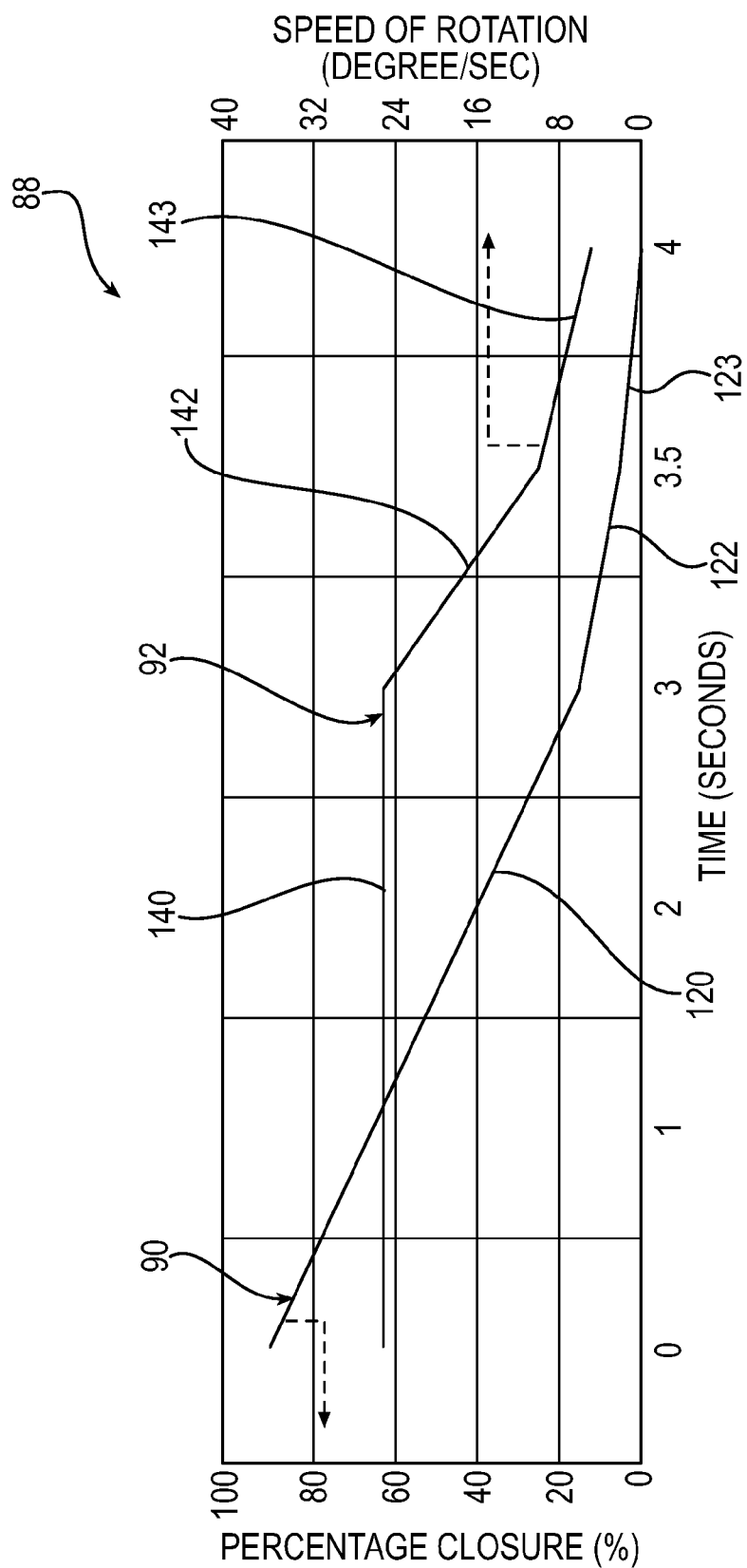
FIG. 3 is a graphical representation of the closure rate of a valve used in the system of FIG. 2.

Turning now to FIG. 3, via receipt of the inputs from the sensors 82, the controller 80 controls each piezoelectric motor 70 to allow for closure of a respective fill control valve 40 by varying the speed profile of the valve 40 and/or to control of the percentage of closure of the valve 40. Thus, the controller 80 controls each piezoelectric motor 70 to control the speed profile of the valve member 41 of each valve 40, thereby controlling the closure rate of each valve 40.

In the depicted valve closure graph 88 of FIG. 3, a variable closure graph 90 is shown as result of the amount of closure (x-axis) of a valve 40 over time (y-axis), or more specifically in the case of a ball valve, as a result of the amount of rotation in units of percentage closure (x-axis) of the valve member 41 over time in units of seconds (y-axis).

It will be appreciated that while the variable closure graph 90 depicts closure of the valve 40 from an open position to a fully closed position, the graph depicts percentage closure with respect to the open position at the start of closure of the valve 40. Accordingly, the valve 40 may or may not be 100% open at the start of closure of the valve 40, though the valve 40 will be generally 100% closed at the end of closure of the valve 40.

Graphed against the variable closure graph 90 is a corresponding variable speed of rotation graph 92 of the valve member 41 of the valve 40. As mentioned, the variable speed of the valve member 41 corresponds to the variable closure rate of the valve 40. The speed of rotation graph is shown in speed in units of degrees of rotation of the respective valve member 41 per second (x-axis) over time in seconds (y-axis), where in the depicted embodiment the valve member 41 is a ball valve member.

In a preferred example depicted in FIG. 3, the controller 80, via control of a piezoelectric motor 70, allows for closure of a respective fill control valve 40 at a first closure rate 120 and thereafter at a second relatively slower valve closure rate 122 after a prescribed amount of fluid has passed through the fill control valve 40. The controller 80 receives inputs from a respective sensor 82 corresponding to the prescribed amount of fuel passing through the fill control valve 40 while the valve 40 closes at the first closure rate 120. This prescribed amount of fuel is a lesser amount than the prescribed volume of fuel to which the respective tank 34 is ultimately to be filled.

The controller 80 also controls the valve to close at a third closure rate 123 subsequent the first and second closure rates 120 and 122 after a prescribed amount of fluid has passed through the valve at the second closure rate 122. The third closure rate 123 is relatively slower than each of the first and second valve closure rates 120 and 122.

The aforementioned closure sequence generally allows for a rapid initial closure to achieve an overall rapid closure of the valve 40. The transition to the second and third progressively slower closure rates minimizes surge pressure through the valve 40 minimizing refuel overshoot.

Each of the first, second and third valve closure rates 120, 122 and 123 is a continuously linearly reducing rate. The controller 80 controls the valve 40 via the motor 70 to allow for a transition that is generally quick, and preferably immediate, between the closure rates 120, 122 and 123. In other words, the transition is without pause, stoppage or other transitional closure rate. This transition aids a fast overall closure of the valve 40.

As shown in FIG. 3, the controller 80 closes the valve 40 at the first closure rate 120 for a relatively longer period of time than at the second valve closure rate 122 and at the third valve closure rate 123. In some embodiments, the second valve closure rate 122 may likewise be controlled to be relatively longer than the subsequent third valve closure rate 123. The first valve closure rate generally provides greater than 50% closure of the fill control valve 40 to allow for the rapid initial closure of the valve 40. This corresponds to greater than 50% rotation of the associated valve member 41 from the open to the closed position.

Turning to the valve closure speed graphing of FIG. 3, it can be seen that the valve closure rates 120, 122 and 123 can be described as results of the controller 80 moving the valve member 41 of the fill control valve 40 at corresponding varying speeds. In the case of a ball valve, the speed of closure can be described as the speed of rotation of the associated ball valve member 41 between its respective open and closed positions.

For example, the first valve closure rate 120 is a result of the controller 80 moving the valve member 41 at a constant speed during a first phase 140 corresponding to the first valve closure rate 120. The second and third valve closure rates 122 and 123 are separate results of the controller 80 moving the valve member 41 at varying, and preferably continuously linearly reducing, speeds at respective second and third phases 142 and 143 corresponding to the second and third valve closure rates 122 and 123.

The valve member 41 moves at a constant speed during the first phase 140 to aid in rapid initial closure of the valve 40. Thereafter, the speed of the valve member 41 is continuously reduced during the second phase 142 and the third phase 143 to minimize surge pressure in and/or through the valve 40.

Particularly, the constant speed of the first phase 140 is relatively faster than any speed during the second phase 142. Likewise, any speed during the second phase 142 is relatively faster than any speed during the third phase 143. Additionally, the first speed of the second phase 142 is equal to the constant speed of the first phase 140 to provide smooth transitioning and flow properties through the valve 40 during the progressive slowdown of the moving valve member 41.

Via control by the controller 80, the respective piezoelectric motors 70 may be controlled via voltage amplitude control, excitation frequency control, and/or pulse width modulation supplied to the motors 70 by any suitable componentry to obtain the aforementioned variable closure rates of the respective valve 40. Each of the motors 70 may be controlled the same or differently.

For example, with respect to control of a motor 70 via pulse with modulation, a wider pulse may correspond to a bigger duty cycle which may translate into a bigger motor step size at a time. The repetition rate of the pulses may thus correspond to the number of steps per second signaling the motor speed. Varying the duty cycle and the repetition rate of the pulses can make the motor accelerate or decelerate as needed.

In summary, the invention provides a fuel delivery system 32 for filling a fuel tank 34 with a prescribed volume of fuel. The delivery system 32 includes a fuel tank 34, a piezoelectrically-actuated fill control valve 40 for controlling flow of fuel into the fuel tank 34, and a controller 80 for controlling the closure rate of the fill control valve 40 to accurately control the volume of fuel provided to the fuel tank 34. The controller 80 receives an input corresponding to a measured volume of flow through the system 32 and allows for closure of the fill valve 40 at variable closure rates. The fill control valve 40 is piezoelectrically-actuated and controlled by the controller 80 such that each successive variable closure rate is relatively slower than the previous closure rate. In this way impact loads from moving the valve member(s) 41 from the opened position to the closed position to shut off the fill control valve(s) 40 are minimized to achieve a fill volume of the one or more tanks 34 as close as possible to respective prescribed volumes.

Also included is a method of filling a fuel tank 34 with a prescribed volume of fuel. Turning again to FIGS. 2 and 3, the method includes the steps of (a) opening a piezoelectrically-actuated fill control valve 40 fluidly connected to the fuel tank 34 to allow fuel into the tank 34; (b) closing the fill control valve 40 at a first valve closure rate 120 after the fill control valve 40 receives a closing signal from a controller 80 receiving an input corresponding to a measured volume of flow through the system 32; and (c) after closing the fill control valve 40 at the first valve closure rate 120, closing the fill control valve 40 at a second relatively slower valve closure rate 122 after a prescribed amount of fluid has passed through the fill control valve 40. The method also includes the step of closing the fill control valve 40 at a third valve closure rate 123 after a prescribed amount of fluid has passed through the fill control valve 40 at the first and second valve closure rates 120 and 122. The third valve closure rate 123 is relatively slower than each of the first and second valve closure rates 120 and 122.

The closing the fill control valve 40 at the first valve closure rate 120 occurs for a relatively longer period of time than the closing the fill control valve 40 at the second valve closure rate 122. Closing the fill control valve 40 at the first valve closure rate 120 includes closing the fill control valve 40 at a constant speed. Closing the fill control valve 40 at the second valve closure rate 122 includes moving a valve member 41 of the fill control valve 40 at a constant speed from an open position towards a closed position, and wherein closing the fill control valve 40 at the second valve closure rate includes moving the valve member 41 towards the closed position at a continuously linearly reducing speed. The constant speed is relatively faster than any speed during the continuously linearly reducing speed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel delivery system for filling a fuel tank with a prescribed volume of fuel, the fuel delivery system comprising:
 a fill control valve fluidly connectable to the fuel tank for controlling flow of fuel into the fuel tank, wherein the fill control valve is a piezoelectrically-actuated shutoff valve for shutting off flow into at least a portion of the fuel tank; and
 a controller for controlling a closure rate of the fill control valve to accurately control the volume of fuel provided to the fuel tank, wherein the controller receives an input corresponding to a measured volume of flow through the system, the controller allowing for closure of the fill control valve at a first valve closure rate and thereafter at a second relatively slower valve closure rate after a prescribed amount of fluid has passed through the fill control valve.

2. The fuel delivery system of claim 1, further including a sensor sensing the fluid passing through the fill control valve and communicatively coupled to the controller, wherein the sensor sends to the controller an output corresponding to the measured volume of flow through the system.

3. The fuel delivery system of claim 1, wherein each of the first and second valve closure rates is a continuously linearly reducing rate.

4. The fuel delivery system of claim 1, wherein the fill control valve has a valve member movable between an open position allowing flow through the fill control valve and a closed position stopping flow through the fill control valve, and wherein the first valve closure rate is a result of the controller moving the valve member to the closed position at a constant speed, and wherein the second valve closure rate is a result of the controller moving the valve member to the closed position at a continuously linearly reducing speed.

5. The fuel delivery system of claim 1, wherein the controller allows for closure of the fill control valve for a relatively longer period of time at the first valve closure rate than at the second valve closure rate.

6. The fuel delivery system of claim 1, wherein the controller transitions the closure of the fill control valve from the first valve closure rate to the second valve closure rate without pause in closure of the valve.

7. The fuel delivery system of claim 1, wherein the first valve closure rate provides greater than 50% closure of the fill control valve.

8. The fuel delivery system of claim 1, in combination with the fuel tank, the fill control valve being connected to the fuel tank.

9. The combination of claim 8, further in combination with an aircraft including a fuselage and a plurality of wings, the fuel tank being located within the fuselage or the wings.

10. The fuel delivery system of claim 1, in combination with a plurality of fuel tanks fluidly connected via a plurality of fill control valves.

11. The fuel delivery system of claim 10, wherein the controller separately controls the closure rate of each fill control valve of the plurality of fill control valves to accurately control the volume of fuel provided to each fuel tank, and wherein the controller receives an input corresponding to a measured volume of flow through each fill control valve of the plurality of fill control valves.

12. A fuel delivery system for filling a fuel tank with a prescribed volume of fuel, the fuel delivery system comprising:
a fuel tank;
a fill control valve fluidly connected to the fuel tank for controlling flow of fuel into the fuel tank, the fill control valve having a valve member movable between an open position allowing flow through the fill control valve and a closed position stopping flow through the fill control valve, wherein the fill control valve is a piezoelectrically-actuated shutoff valve for shutting off flow into at least a portion of the fuel tank; and
a controller for controlling the closure rate of the valve member to accurately control the volume of fuel provided to the fuel tank, wherein the controller is configured to receive an input corresponding to a measured volume of flow through the system, and wherein the controller is configured to allow for movement of the valve member to the closed position at a constant speed during a first phase and thereafter at a continuously linearly reducing speed during a second phase, wherein the constant speed of the first phase is faster than any speed during the second phase.

13. The fuel delivery system of claim 12, wherein the controller is configured to transition the valve member from the first phase to the second phase without pause in movement of the valve member, and wherein the first speed of the second phase is equal to the constant speed of phase one.

14. The fuel delivery system of claim 12, wherein the controller is configured to control the fill control valve for a relatively longer first phase than second phase.

15. The fuel delivery system of claim 12, wherein the constant speed closure of the fill control valve in the first phase provides greater than 50% closure of the valve member from the open position to the closed position.

16. A method of filling a fuel tank with a prescribed volume of fuel, the method comprising the steps of:
opening a piezoelectrically-actuated fill control valve fluidly connected to the fuel tank to allow fuel into the tank;
closing the fill control valve at a first valve closure rate after the fill control valve receives a closing signal from a controller receiving an input corresponding to a measured volume of flow through the system; and
after closing the fill control valve at the first valve closure rate, closing the fill control valve at a second relatively slower valve closure rate after a prescribed amount of fluid has passed through the fill control valve.

17. The method of claim 16, further including the step of closing the fill control valve at a third valve closure rate after a prescribed amount of fluid has passed through the fill control valve at the first and second valve closure rates, wherein the third valve closure rate is relatively slower than each of the first and second valve closure rates.

18. The method of claim 16, wherein closing the fill control valve at the first valve closure rate occurs for a relatively longer period of time than the closing the fill control valve at the second valve closure rate.

19. The method of claim 16, wherein closing the fill control valve at the first valve closure rate includes moving a valve member of the fill control valve at a constant speed from an open position towards a closed position, and wherein closing the fill control valve at the second valve closure rate includes moving the valve member towards the closed position at a continuously linearly reducing speed.

20. The method of claim 19, wherein the constant speed is relatively faster than any speed during the continuously linearly reducing speed.

* * * * *